United States Patent [19]

King et al.

[11] 4,191,980
[45] Mar. 4, 1980

[54] TRANSDUCERS WITH TAPERED EDGE PROFILES AND ASSEMBLY THEREOF

[75] Inventors: Francis K. King, San Jose, Calif.; Ronald J. Maurine; Donald J. Wanek, both of Rochester, Minn.

[73] Assignee: International Business Machines Corporation, Armonk, N.Y.

[21] Appl. No.: 974,633

[22] Filed: Dec. 29, 1978

[51] Int. Cl.$^2$ .................... G11B 5/60; G11B 5/82; G11B 25/04
[52] U.S. Cl. .................................. 360/99; 360/103; 360/122
[58] Field of Search .............................. 360/97–99, 360/86, 102–103, 122, 133, 135

[56] References Cited

U.S. PATENT DOCUMENTS

| | | | |
|---|---|---|---|
| 3,193,835 | 7/1965 | Wadey | 360/103 |
| 3,668,658 | 6/1972 | Flores et al. | 360/133 |
| 3,823,416 | 7/1974 | Warner | 360/122 |
| 3,855,625 | 12/1974 | Garnier et al. | 360/103 |
| 3,872,507 | 3/1975 | Sand et al. | 360/102 |
| 3,956,771 | 5/1976 | Barnes et al. | 360/127 |
| 4,089,029 | 5/1978 | Castrodale | 360/99 |
| 4,110,804 | 8/1978 | Castrodale et al. | 360/121 |

OTHER PUBLICATIONS

IBM Tech. Disc. Bull., Aug. 1977, p. 1202, McWhinney, Trirail Slider with Low-Profile Center Rail.

*Primary Examiner*—Alfred H. Eddleman
*Attorney, Agent, or Firm*—Keith T. Bleuer

[57] ABSTRACT

An assembly of a pair of magnetic transducers held in substantial contact with a flexible magnetic disk wherein each transducer has a pair of disk contacting lands broadening in contour toward the trailing end of the transducer and tapering in contour toward the leading end of the transducer, with the leading and side edges of each land being gradually blended into the surrounding active surface of the transducer and with the trailing edge of the land being sharp. A first one of the lands of each transducer has the read/write magnetic gap in it, and this land is located opposite the land of the other transducer not having the read/write gap in it which is wider than the first land. The centers of the opposite lands are in alignment, and the centers are measured on a plane passing through the read/write gaps of the transducers.

8 Claims, 11 Drawing Figures

PRIOR ART

FIG. 8

PRIOR ART

TRANSDUCERS WITH TAPERED EDGE PROFILES AND ASSEMBLY THEREOF

CROSS REFERENCES TO RELATED APPLICATION

This application is related to the co-pending application of F. K. King et al, Ser. No. 974,480, filed Dec. 29, 1978, for Transducer Carriage Assembly.

BACKGROUND OF THE INVENTION

The invention relates to transducers particularly useful in connection with flexible magnetic disks.

It has been previously proposed to provide such transducers having active surface profiles of such shape as to tend to cause the transducer to fly over the face of a disk with the leading end relatively high with respect to the trailing end due to the air flow along with the disk, and this gives rise to unreliable data transfer at high disk speeds. A more detailed description of such transducers will be hereinafter set forth.

SUMMARY OF THE INVENTION

It is an object of the present invention to provide magnetic transducers with such active face contours that they tend to remain in substantially parallel relationship with the disk during operation.

Briefly, the invention contemplates an improved transducer for use with a flexible magnetic disk having a pair of lands separated by a groove that extends parallel with the direction of disk movement across the transducer. One of the lands has a read/write gap and a pair of erase gaps in it, and the other land is blank and is formed on a ceramic outrigger constituting a part of the transducer. The lands are intended to be in contact or very close contact with an adjacent surface of the flexible disk and are formed to be tapering toward the leading end of the land and broadening toward the trailing end of the land and blended or rounded into the adjacent outer parts of the active surface of the transducer but for the trailing edge of the land which is sharp. Such edge contours cause the land to remain substantially parallel with the adjacent surface of the disk. Two such transducers are provided substantially opposite each other on the two opposite surfaces of the disk, and the center of the active land containing the gaps in one transducer is aligned with the center of the blank land of the opposite transducer so that the blank land, which is larger in area, acts as a seating pad for the opposite smaller active land containing the gaps which thus acts as a presser to flatten out disk irregularities between the transducers.

DESCRIPTION OF THE PRIOR ART

Figure 8:
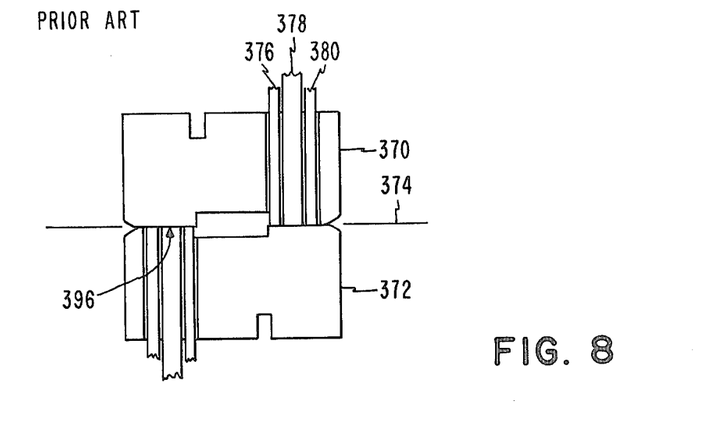
FIG. 8 is a sectional view of a pair of prior art transducers having a flexible magnetic disk positioned between them.
Figure 9:
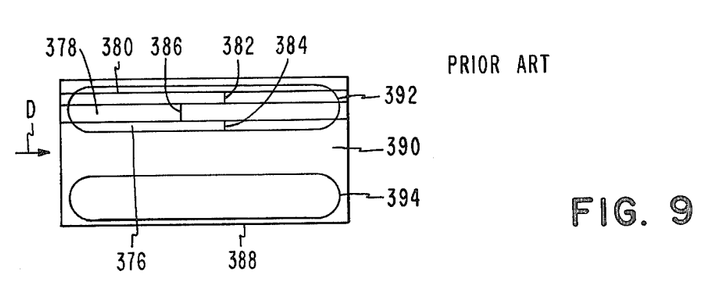
FIG. 9 is a plan view showing the active surface of one of the prior art transducers.

It has been previously proposed to provide a pair of opposite transducers 370 and 372 (see FIG. 8) effective on and in contact recording relationship with a flexible magnetic disk 374, such as one of the type disclosed by U.S. Pat. No. 3,668,658. Such a transducer is disclosed in Castrodale et al U.S. Pat. No. 4,110,804. Referring to FIG. 8 hereof, the transducer 370 includes three layers 376, 378 and 380 of magnetically permeable core and ceramic spacer to provide erase gaps 382 and 384 and a read/write gap 386. The transducer includes an outrigger 388 of ceramic material which is cut with a channel or groove 390 so that the transducer has this groove extending in the direction D in which the flexible disk 374 moves over the transducer. The transducer on one side of the groove 390 is formed with a land 392 and on the other side of the groove 390 is formed with a land 394 which are the parts of the transducer in sliding contact with the disk 374. The lands 392 and 394 and the groove 390 together formed the active face 396 of the transducer 370. The widths of the lands 392 and 394 are nearly the same, the land 392 being slightly narrower than the land 394 (such as in the ratio of 9:10). The land 392 has rounded ends of the same radius and parallel sides, and the land 394 is of the same shape as the land 392. The end and parallel edges of the lands 392 and 394 blend into the surrounding portions of the transducer active face 396, that is, the edges are curved rather than sharp. The transducer 372 is identical with the transducer 370, and they are located opposite each other in assembly on opposite faces of the disk 374 as shown in FIG. 8. It will be noted from FIG. 8 that the grooves 390 of the two transducers as an assembly are located slightly out of line (due to the fact that the land 392 is slightly narrower than the land 394), while the side edges of the two transducers are in alignment. The layers 376, 378 and 380 of the transducer 370 are located on the opposite side of the transducer with respect to the corresponding layers in the transducer 372 as is apparent from FIG. 8.

Figure 10:
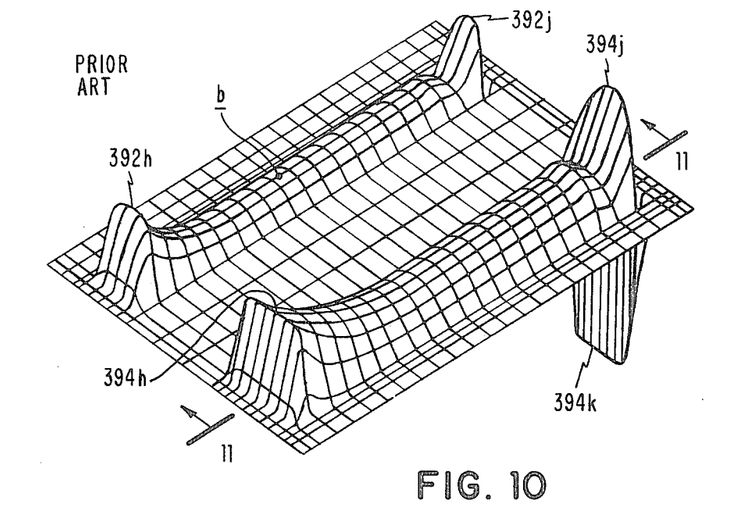
FIG. 10 is a pressure contour map showing the air pressure effective on one of the prior art transducers with the adjacent magnetic disk traveling at high speed over the transducer.
Figure 11:
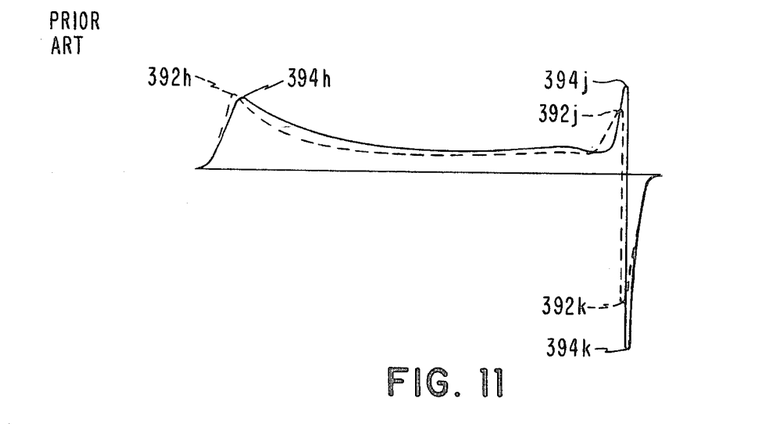
FIG. 11 is a sectional view of the map of FIG. 10 taken on line 11—11 of FIG. 10.

As the disk 374 moves in direction D (parallel with the groove 390) across the face 396 of the transducer 370, the air pressure on the face is as shown in FIGS. 10 and 11. The land 392 provides a relatively high pressure as shown by the graph point 392h at the leading edge of the transducer and provides a relatively high pressure point 392j and a very negative pressure point 392k at the trailing edge of the transducer. The point b in FIG. 10 indicates the pressure at the gap 386. The land 394 provides a high pressure as indicated by the graph point 394h at the leading edge of the transducer and provides at the trailing edge a high pressure and a very low pressure as indicated respectively by the points 394j and 394k. The pressures for the land 394 are somewhat more extreme than those for the land 392 since the land 394 is the slightly wider. The high pressures indicated by the points 392h and 394h at the leading edge of the transducer 370 and the negative pressures 392k and 394k of substantial magnitude tend to depress the trailing end of the transducer onto the disk 374 so that the transducer 370 tends to have a raised leading edge and a lowered trailing edge (in the disposition of a surf board or a boat traveling across the water) so that the end result is that the read/write gap 386 has a raised, rather variable and unreliable spacing with respect to the disk 374 resulting in unreliable data transfer, particularly at very high speeds of the disk 374.

DESCRIPTION OF THE PREFERRED EMBODIMENT

Figure 1:
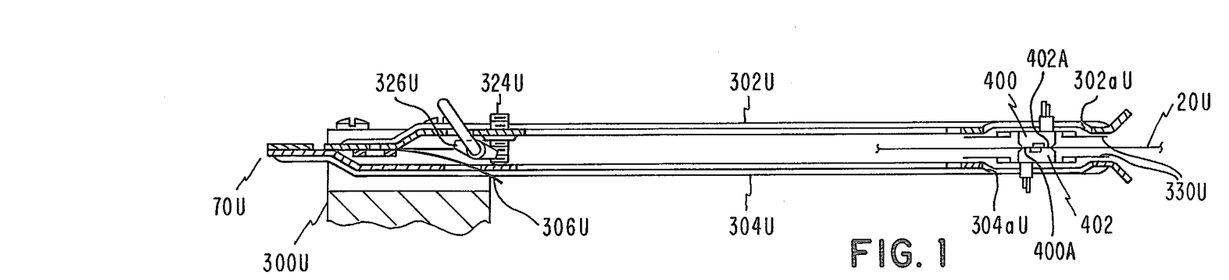
FIG. 1 is a longitudinal sectional view of a carriage including a pair of swing arms each of which carries a transducer having its active surface in contact or near contact with a flexible magnetic disk between the transducers and between the arms.

The transducer pair assembly of the invention includes the two transducers 400 and 402 disposed opposite each other (see FIG. 1, hereof). The two transducers may be carried by means of a carriage 70U and if desired, this may be similar to the carriage 70 disclosed in Castrodale et al U.S. Pat. No. 4,089,029, issued May 9, 1978. The carriage 70U is used for holding the transducers 400 and 402 in contact or at a very low flying height with respect to a magnetic disk 20U of thin flexible material, and the disk 20U may be a part of a disk assembly such as one including the disk 20 of U.S. Pat. No. 4,089,029 and shown in FIG. 1 of this patent. The carriage 70U together with the two transducers 400 and 402 may be used in the disk drive machine disclosed in this U.S. patent and for the same purposes and in the same manner.

Although, as just mentioned, the carriage 70U may have the construction of the carriage 70 in this U.S. Pat. No. 4,089,029, nevertheless, the carriage 70U is shown in FIG. 1 hereof in the form in which it is disclosed in a co-pending application of King, Ser. No. 974,480, filed Dec. 29, 1978, and the same reference numerals are used in FIG. 1 hereof as in said co-pending application but with the addition of the suffix "U" in each case.

Figure 5:
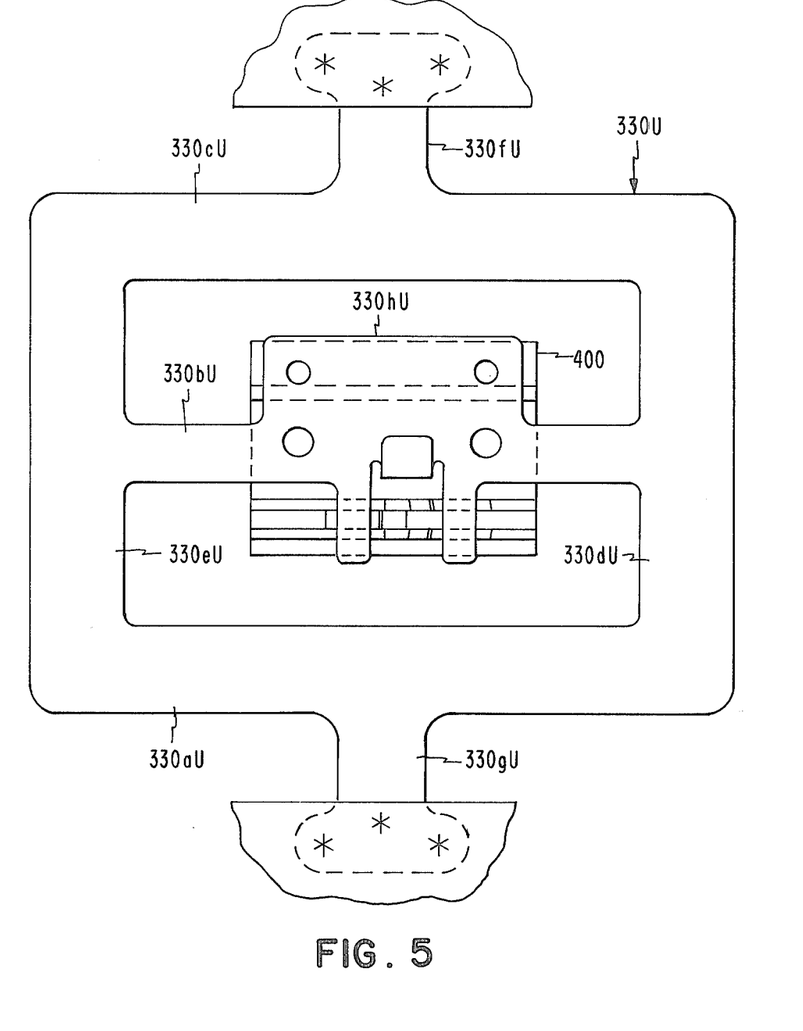
FIG. 5 is a plan view of a gimbal spring supporting one of the transducers with respect to the associated swing arm.

Referring to FIG. 1 hereof, the carriage 70U may be seen to comprise a base part 300U. The base part 300U is that part of the FIG. 1 assembly that is moved in translation in order to move the transducers 400 and 402 across the disk 20U. The carriage 70U also includes the swing arms 302U and 304U, and a leaf spring 306U. The spring 306U has the three-fold function of pivotally mounting the swing arms 302U and 304U with respect to the base part 300U, swingingly mounting the arms 302U and 304U with respect to each other so that they may swing outwardly from each other and yieldably moving the swing arms 302U and 304U together. A set screw 324U limits the swinging movement of the arms 302U and 304U together, and a rotatable toggle 326U swings the arms apart against the action of the spring 306U. The transducers 400 and 402 are each respectively carried by the arms 302U and 304U through the intermediary of a gimbal spring 330U formed in an approximate figure EIGHT form, from a uniform thickness sheet of yieldable metal. The spring 330U has end tabs 330fU and 330gU, and these end tabs are welded to the arms 302U and 304U at edges of arm openings 302aU and 304aU. The spring also includes legs 330aU–330eU; and the transducer 400, for example, is fixed to an enlargement 330hU on leg 330bU as shown in FIG. 5. The gimbal springs 330U are slightly stressed out of flatness when the arms 302U and 304U are in their positions of minimum spacing so as to hold the transducers 400 and 402 in pressure engagement with the disk 20U or at a minimum flying height with respect to the disk 20U. The transducers 400 and 402 respectively have the active surfaces 400A and 402A in contact with or at a minimum flying height with respect to the disk 20U; and, except for these surfaces 400A and 402A, the transducers 400 and 402 are identical with the transducer disclosed in Castrodale et al, U.S. Pat. No. 4,110,804. Since the transducers 400 and 402 are identical, the transducer 400 will be briefly described in connection with FIGS. 2 and 3 hereof.

Figure 2:
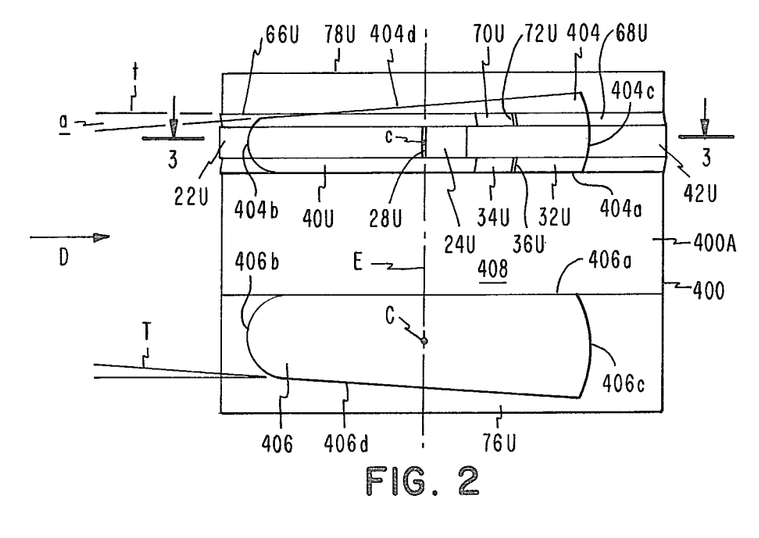
FIG. 2 is a plan view of the active surface of one of the transducers.
Figure 3:
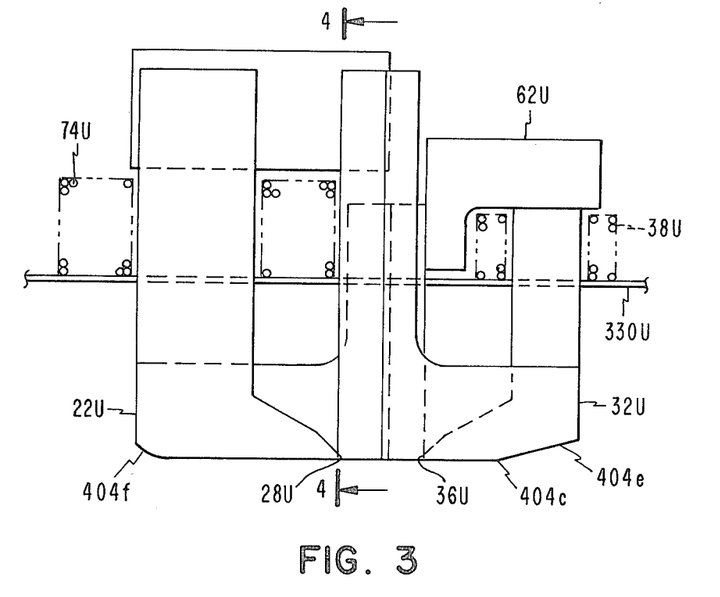
FIG. 3 is a sectional view taken on line 3—3 of FIG. 2.

Referring to FIGS. 2 and 3, the reference numerals used therein are the same as the reference numerals for the corresponding parts disclosed in U.S. Pat. No. 4,110,804 except for the addition of the suffix "U". The head 400 comprises a pair of magnetically permeable core portions 22U and 24U providing a read/write gap 28U which is on the active face 400A of the transducer 400. The head also includes magnetically permeable erase core portions 32U, 34U, 68U and 70U providing erase gaps 36U and 72U also on surface 400A. Ceramic spacers 40U, 66U and 42U are in alignment with the magnetically permeable core portions in the direction D which is that direction in which the disk 20U passes across the active surface 400A.

An erase coil 38U lies around the cores 32U and 68U, and an L-shaped side bar 62U lies across the upper end of the erase coil 38U so as to complete erase magnetic circuits. A read/write coil 74U encircles the core portion 22U.

As is apparent particularly from FIG. 2, the above described core portions and spacers provide three layers of material. One of these layers is made up of the spacer 66U together with the core portions 68U and 70U; a second layer is made up of the core portions 22U and 24U together with the spacer 42U; and the third layer is made up of the core portions 32U and 34U together with the spacer 40U. A relatively narrow outrigger 78U is disposed on one side of these layers, and a relatively wide outrigger 76U is disposed on the other side of these layers. For a more detailed description of the construction of the transducer 400 and for a description of its operation, U.S. Pat. No. 4,110,804 may be referred to.

The active surface 400A of the transducer 400 includes a relatively narrow land 404 and a relatively wide land 406 spaced by a groove 408 between them which is cut in the outrigger 76U. The ratio of the widths of the narrow land 404 to the wide land 406 is roughly 2:3 (an appreciable and substantially greater ratio than the ratio of land widths of 9:10 of the prior art structures). The groove 408 and the inner edges 404a and 406a of the lands 404 and 406 extend in the direction D and at right angles to the gap 28U. The land 404 is defined by end surfaces of the core portions 32U, 34U, 68U and 22U, end surfaces of spacers 42U, 40U and 66U and surfaces of the outrigger 78U and has a leading end or edge 404b of a relatively small radius and a trailing end or edge 404c of a greater radius. The land 404 has an outer edge 404d which is curved on a great radius, and the tangent t to this radius extends at a small angle a, such as 2° or 4°, with respect to the direction D. The land 404 thus broadens from the leading end 404b to the trailing end 404c and tapers in the opposite direction. The trailing edge 404c is sharp as shown in FIG. 3, and the surface 404e trailing the edge 404c is straight in cross section. The edges 404b and 404d are blended or rounded into the surrounding parts of the surface 400A, this blending for the edge 404b being shown by the curved land surface 404f in FIG. 3. The portion of the land 404 enclosed by the edges 404a-404d has a nominal center c which, as is apparent from FIG. 2, is somewhat off center with respect to the sides of the core portions 24U and 22U. The center c is taken on the plane E which extends through the gap 28U at right angles to the direction D and is midway between the intersections of the edges 404a and 404d with the plane E.

The land 406 is formed completely on the outrigger 76U and has the edges 406a, 406b, 406c and 406d corresponding to the edges 404a-404d. The leading edge 406b is on a considerably smaller radius than the trailing edge 406c, and the side edge 406d is on a considerably greater radius. A tangent T to the edge 406d extends at much the same small angle to the direction D as the tangent t. The land 406 thus broadens from the leading edge 406b to the trailing edge 406c and tapers in the opposite direction. The edge 406c is a sharp edge similar to the edge 404c, while the edges 406b and 406d are blended by curved surface portions with the surrounding parts of the land surface 400A, similar to the edges 404b and 404d. The nominal center C of the land 406 is on the plane E and is midway between the intersections of the edges 406a and 406d with the plane E.

Figure 4:
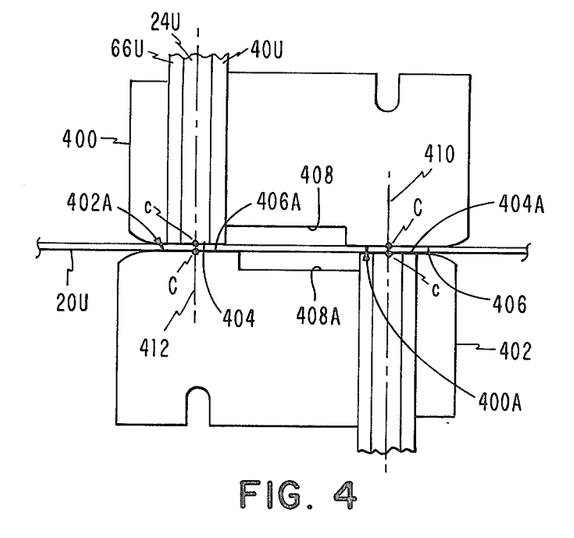
FIG. 4 is a sectional view taken on line 4—4 of FIG. 3 and showing in addition the other transducer located just below the transducer shown in FIG. 3.

As has been previously mentioned, the transducer 402 is identical with the transducer 400. As the transducers 400 and 402 are held in position by the arms 302U and 304U on the opposite sides of the disk 20U, the active surface 402A of the transducer 402 faces the active surface 400A of the transducer 400. The surface 402A has the lands 404A and 406A which are identical with the lands 404 and 406 previously described in connection with the transducer 400. As the transducers 400 and 402 are held by the arms 302U and 304U, the transducers 400 and 402 are slightly out of line, at least considering the side edges of the transducers 400 and 402 as is shown in FIG. 4. The center c of the land 404A is in alignment with the center C of the land 406, and these centers are disposed upon a center line 410 that extends at right angles to the disk 20U. The alignment is the same for the lands 404 and 406A; the centers c and C are in alignment and are on the same center line 412 that extends at right angles to the disk 20U.

In the operation of the structures shown in FIGS. 1 to 5, the disk 20U rotates about its center and passes between the transducers 400 and 402 in the direction D, parallel with the grooves 408 and 408A of the transducers 400 and 402. The gimbal springs 330U hold the transducers 400 and 402 in a so-called "contact" recording disposition with respect to the disk 20U in which, however, the transducer lands 404, 406, 404A and 406A are not in actual contact with the disk 20U but rather fly with a very close spacing between these lands and the disk 20U which is less than 14 microinches and with the lands actually contacting off raised portions of the disk 20U. The gimbal springs 330U bend and maintain the transducers in this relationship with respect to the disk 20U, with the transducers rolling about an axis parallel with the direction D, pitching on an axis perpendicular to the direction D and moving together in translation in a direction parallel with the axis of rotation of the disk 20U, depending on the undulations in the disk 20U as it rotates. As has been previously mentioned, the disk 20U is of a very thin flexible material and thus may be expected to have such undulations.

The two heads 400 and 402 are thus loaded against each other at opposite sides of the disk 20U and the relatively wide lands 406 and 406A are respectively centered with respect to the opposite narrow lands 404 and 404A. The wide lands 406 and 406A thus act as relatively wide compliance surfaces and as relatively wide seating pads for the opposite narrow lands 404 and 404A which act as relatively narrow compliance surfaces and as pressers to flatten out any irregularities (concave or convex) in the disk 20U. This arrangement provides a stable compliance system in which, due to the large difference in width of the two corresponding opposite compliance surfaces, any minor misalignments of these surfaces do not degrade the data transfer. There is also with this system an easier track to core alignment; and an increase in the manufacturing yield for the transducers 400 and 402 is possible, since tolerances in manufacture need not be held so closely. The wider compliance surfaces (lands 406 and 406A) provide the support for a higher transducer to disk spacing to reduce wear of both the disk and of the transducers, and the narrow lands 404 and 404A in particular constitute narrow compliance surfaces effective for controlling the transducer to disk spacing for proper data transfer.

The shapes of the lands 404, 406, 404A and 406A assure that the transducers 400 and 402 do not tilt with respect to the disk 20U and have the same spacing for the complete lengths of the lands and transducers from the leading ends of the transducers to their trailing ends. For the transducer 400, the short radii curved leading ends 404b and 406b, the larger radii trailing ends 404c and 406c, the curved side edges 404d and 406d that extend at the tangents t and T with respect to the direction D so that the lands 404 and 406 broaden from their leading edges to their trailing edges and taper from their trailing edges to their leading edges, the curved surface blending of the edges 404b, 404d, 406b and 406d and the sharpness of the edges 404c and 406c assure this result. More particularly, the lands 404, 404A, 406 and 406A in broadening from their leading edges to their trailing edges provide air pressure relief for the air carried by the disk 20U which derogates lift effects on the leading ends of the transducers. The sharpness of the trailing edges 404c and 406c reduces a drastic negative pressure which would otherwise occur to help in holding the transducer lands 404 and 406 parallel with the face of the disk 20U rather than dragging the trailing ends of the transducers downwardly onto the disk. The transducers thus do not tend to air-plane upwardly so that the lands 404 and 406 are flat on the disk 20U and the gap 28U remains in close unvarying proximity with the disk 20U for reliable continuous data transfer between disk 20U and the transducer 400.

Since the air pressure variations on the active surfaces 400A of the transducer 400 are less, there is a potential for reduced loading of the transducer on the disk 20U, and this reduced loading leads to the potential for improved wear both on the transducer and on the disk. The larger bearing area of the inactive, relatively wide land 406 for transducer 400 creates a greater degree of transducer and disk separation improving the wear characteristics on this inactive side. The smaller width active land 404 permits more reliably uniform, very small transducer-disk spacing when the disk 20U has surface variations that are oriented radially of the disk, and in addition shorter wave length disk surface variations can be accommodated. The same of course is all true with respect to the transducer 402 which is identical with the transducer 400.

Figure 6:
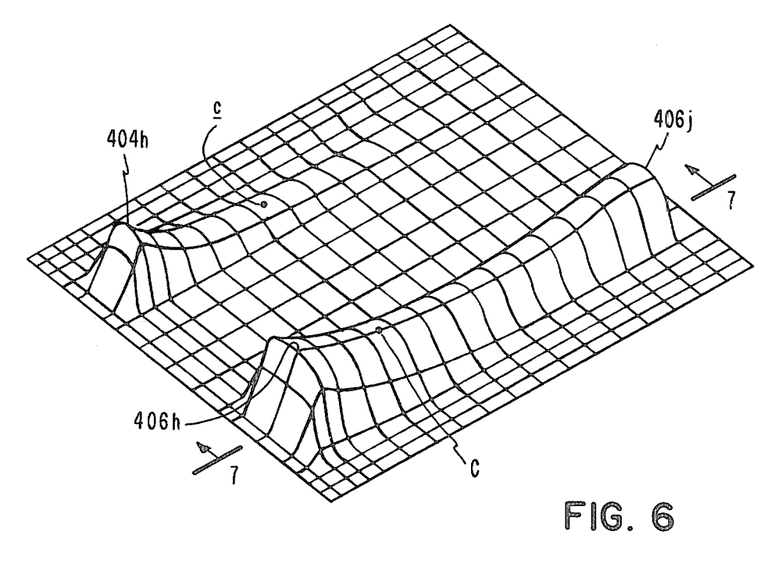
FIG. 6 is a pressure contour map of the air pressure on one of the transducer active surfaces during a high speed movement of a magnetic disk over the surface.
Figure 7:
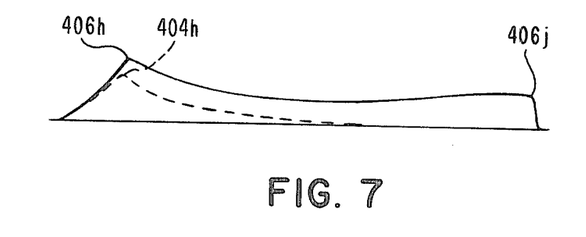
FIG. 7 is a sectional view of the map of FIG. 6 taken on line 7—7 of FIG. 6.

FIGS. 6 and 7, the ordinates of which are on the same scales as the ordinates of FIGS. 10 and 11 respectively, illustrate the air pressures effective on the transducer surface 400A and lands 404 and 406. It will be observed from FIGS. 6 and 7 that the pressures along the lands 404 and 406 and particularly through the centers c and C are initially high at points 404h and 406h. The presure along the land 404 then decreases toward the trailing edge of the transducer and becomes zero midway between the leading and trailing edges of the transducer. The pressure along the land 406 and through the center C in the direction D also generally decreases but has a high point 406j adjacent the trailing end of the transducer 400. It will thus be observed that the pressure build up adjacent the leading edge of the transducer is not unduly high nor is there a negative pressure adjacent the trailing edge of the transducer. The plots of the air pressure shown in FIGS. 6 and 7 may be contrasted with those shown in FIGS. 10 and 11 which exhibit higher positive pressures adjacent the leading edge of the transducer and high negative pressures adjacent the trailing transducer edge that would tend to tilt the transducer downwardly on its trailing edge and upwardly on its leading edge to thus provide a potential instability of the transducer with respect to the companion disk.

We claim:

1. A magnetic transducer for use with a magnetic disk comprising:
   a transducer body having a pair of magnetically permeable core pieces extending therethrough,
   an active surface on said transducer body having a pair of lands adapted to contact or be in near contact with the magnetic disk as the disk rotates with said lands being separated by a groove extending longitudinally of said active surface,
   said core portions having a transducing gap therebetween on one of said lands on said active surface,
   each of said lands broadening longitudinally of said surface from a leading end of the transducer to the trailing end of the transducer whereby to modify the air pressure effective on the lands due to rotation of the disk.

2. A transducer as set forth in claim 1, said lands each being defined by curved leading and trailing edges and by an outer edge, said leading and outer edges each being blended by curved surfaces into surrounding portions of said active surface and said trailing edge being sharp.

3. A transducer as set forth in claim 1, said land containing said transducing gap being narrower than the other of said lands.

4. An assembly of a pair of magnetic transducers,
   each of said transducers having an active surface with a relatively narrow land and a relatively wide land separated by a groove,
   means for holding said transducers positioned opposite each other with the wide land of one of the transducers opposite the narrow land of the other transducer so that a magnetic disk passing between said active surfaces of said transducers has the wide and narrow lands effective on opposite disk faces and directly opposite each other, and
   a pair of magnetically permeable core portions extending through one of said lands of each of said transducers and forming a magnetic gap on this land and on the active surface of the transducer,
   the center of said wide land of each of said transducers being positioned directly opposite the center of the narrow land of the other transducer, said center of each of said lands being located midway between the opposite edges of the land on the active surface of the transducer and on a plane containing said gap of the transducer and extending normal to said active surface of the transducer.

5. A transducer assembly as set forth in claim 4, said magnetically permeable core portions extending through the narrow one of said lands of each of said transducers so as to provide their magnetic gap on the narrow land.

6. A transducer assembly as set forth in claim 4, each of said lands on each of said transducers broadening longitudinally on the active surface of the transducer from a leading end of the transducer to the trailing end of the transducer.

7. In combination,
   a flexible magnetic disk,
   means for drivingly rotating said disk,
   a pair of transducers,
   means for holding said transducers with active surfaces of the transducers in contact or near contact with opposite surfaces of the disk and said transducers being positioned opposite each other,
   the active surface of each of said transducers being defined by a relatively narrow land and a relatively wide land separated by a groove and said means for holding said transducers holding the wide land of one of the transducers opposite the narrow land of the other transducer so that said magnetic disk passing between said active surfaces of the transducers has the wide and narrow lands effective on opposite disk faces and directly opposite each other, and
   a pair of magnetically permeable core portions extending through one of said lands of each of said transducers and having a magnetic gap on this land and on said active surface of this transducer,
   the center of said wide land of each of said transducers being positioned directly opposite the center of the narrow land of the other transducer, said center of each of said lands being located midway between the opposite edges of the land on said active surface of the transducer having this land and on a plane containing said gap for the transducer and extending normally of its said active surface.

8. The combination as set forth in claim 7, said lands of each of said transducers broadening longitudinally of said active surface of the transducer from the leading end of the transducer to the trailing end of the transducer whereby to modify the air pressure effective on the lands due to rotation of the disk.

* * * * *